United States Patent
Bodart et al.

(10) Patent No.: US 6,982,106 B2
(45) Date of Patent: Jan. 3, 2006

(54) STRUCTURES WITH MULTIPLE POLYMERIC LAYERS

(75) Inventors: Vincent Bodart, Namur (BE); Jean-Marie Oreins, Haacht (BE); Guy Laurent, Vedrin (BE); Fredy Declerck, Brussels (BE); Alexandra Malinova, Montpellier (FR); Nadia Torres, Montpellier (FR); Bernard Boutevin, Montpellier (FR)

(73) Assignee: SOLVAY (Societe Anonyme), Brussels (BE)

(*) Notice: Subject to any disclaimer, the term of this patent is extended or adjusted under 35 U.S.C. 154(b) by 9 days.

(21) Appl. No.: 10/451,177

(22) PCT Filed: Dec. 18, 2001

(86) PCT No.: PCT/EP01/15037

§ 371 (c)(1),
(2), (4) Date: Nov. 7, 2003

(87) PCT Pub. No.: WO02/051633

PCT Pub. Date: Jul. 4, 2002

(65) Prior Publication Data

US 2004/0071973 A1    Apr. 15, 2004

(30) Foreign Application Priority Data

Dec. 22, 2000 (FR) .................... 00 17253

(51) Int. Cl.
*B32B 1/08* (2006.01)
*B32B 27/08* (2006.01)
*B32B 27/32* (2006.01)
*B32B 31/04* (2006.01)
*B32B 31/30* (2006.01)

(52) U.S. Cl. .................. 428/36.91; 428/421; 428/515; 428/516; 428/520; 156/244.11; 264/173.14

(58) Field of Classification Search ............ 428/36.91, 428/421, 515, 516, 520; 156/244.11; 264/173.14
See application file for complete search history.

(56) References Cited

U.S. PATENT DOCUMENTS

| | | | | |
|---|---|---|---|---|
| 4,497,856 A | * | 2/1985 | Iwasawa et al. | 220/62.11 |
| 4,588,642 A | * | 5/1986 | Ochiumi | 428/421 |
| 4,810,754 A | | 3/1989 | McCrary | 525/264 |
| 4,959,271 A | | 9/1990 | Sun | 428/476.3 |
| 6,277,914 B1 | * | 8/2001 | Oreins et al. | 525/70 |

FOREIGN PATENT DOCUMENTS

| | | |
|---|---|---|
| EP | 0 239 685 | 10/1987 |
| EP | 0 296 042 | 12/1988 |
| EP | 0 206 689 | 4/1990 |
| EP | 0 976 804 | 2/2000 |
| GB | 962 575 | 7/1964 |
| GB | 1 101 983 | 2/1968 |

* cited by examiner

Primary Examiner—Ramsey Zacharia
(74) Attorney, Agent, or Firm—Oblon, Spivak, McClelland, Maier & Neustadt, P.C.

(57) ABSTRACT

Multilayer polymer structures comprising a layer (A) based on at least one halohydrocarbon polymer linked to a layer (C) based on at least one olefin polymer via a layer (B) containing from 100% to 10% by weight of at least one grafted olefin polymer and from 0 to 90% by weight of at least one halohydrocarbon polymer, the grafted olefin polymer being obtained by grafting a polymerizable monomer, a functional oligomer or a functional telomer onto a preactivated olefin polymer; process for obtaining them and use thereof.

23 Claims, No Drawings

STRUCTURES WITH MULTIPLE POLYMERIC LAYERS

This application is a National Stage application of PCT/EP01/15037 filed Dec. 18, 2001. In addition, priority is claimed to French patent application 00/17253 filed Dec. 22, 2000.

The present invention relates to multilayer polymer structures, to a process for preparing them and to their use.

Halohydrocarbon polymers, and more particularly fluorohydrocarbon polymers, are polymers that have a combination of advantageous properties, and especially impermeability to liquids and gases, high chemical inertness and excellent resistance to ageing. Consequently, they find numerous uses in very diverse fields, and especially in the transportation and storage of liquids and gases and in protection against corrosion. However, they have the drawback of being relatively expensive, which risks limiting their prospects.

One suitable means for reducing the cost of formed articles made of polymers of this type consists in using these polymers in the form of multilayer polymer structures (films, sheets, plaques, tubes, hollow bodies, etc.) in which they are combined with other polymers that moreover provide their own advantages and properties, for instance mechanical strength, sealability, scratch resistance, etc. However, halohydrocarbon polymers, and more particularly fluorohydrocarbon polymers, are known to be materials that are difficult to make adhere to other polymers, especially olefin polymers.

To solve this problem, many solutions have been proposed, and especially that of placing two layers of adhesive between the halohydrocarbon polymer and the olefin polymer.

Thus, patent EP-B1-206 689 relates to a laminate comprising at least two separate adhesive layers in contact consisting of a fluorohydrocarbon polymer modified with a carboxyl, acid anhydride, hydroxyl or epoxide group and an olefin polymer modified with a carboxyl, acid anhydride, hydroxyl or epoxide group that is different from the previous group. These two separate adhesive layers may be placed on a layer of substrate prepared from a material chosen from various polymers, including polyvinylidene fluoride, polyethylene and nylon. Thus, a 4-layer laminate comprising a layer of polyvinylidene fluoride linked to a layer of polyethylene via two separate adhesive layers is cited. This multilayer structure has the drawback of consisting of two layers of adhesive and thus 4 layers in total, which poses technical problems during industrial coextrusion, which is technically easier to envisage if it is limited to 3 layers, i.e. with only one layer of adhesive.

On account of their reduced cost and the technical manufacturing considerations described above, structures having only one adhesive layer are preferred to those comprising more than one adhesive layer.

Thus, the problem that remains is that of providing multilayer polymer structures incorporating an adhesive that can bind satisfactorily to a layer of halohydrocarbon polymer on one side and to a layer of olefin polymer on the other side, so as to form multilayer polymer structures containing only one layer of adhesive.

In order to overcome the abovementioned drawbacks, one object of the present invention is to provide multilayer polymer structures comprising a layer (A) of halohydrocarbon polymer linked to a layer (C) of olefin polymer via only one layer (B) based on a polymer adhesive that allows these structures to combine good adhesion with good barrier properties and with a cost that is not too high, to be readily coextruded industrially, and which is furthermore characterized by a well-controlled structure and architecture.

To this end, the invention relates to multilayer polymer structures comprising a layer (A) based on at least one halohydrocarbon polymer linked to a layer (C) based on at least one olefin polymer via a layer (B) containing from 100% to 10% by weight of at least one grafted olefin polymer and from 0 to 90% by weight of at least one halohydrocarbon polymer, the grafted olefin polymer being obtained by grafting a polymerizable monomer, a functional oligomer or a functional telomer onto a preactivated olefin polymer.

The expression "multilayer polymer structures comprising a layer (A) based on at least one halohydrocarbon polymer linked to a layer (C) based on at least one olefin polymer" is intended to denote multilayer polymer structures containing at least one layer (A) based on at least one halohydrocarbon polymer linked to at least one layer (C) based on at least one olefin polymer. The multilayer polymer structures according to the invention may thus contain one or more layers (A) based on at least one halohydrocarbon polymer linked to one or more layers (C) based on at least one olefin polymer, these layers themselves possibly being linked to layers of other polymers, of metal and/or of fabric.

The multilayer polymer structures according to the invention however preferably contain only one layer (A) based on at least one halohydrocarbon polymer linked to only one layer (C) based on at least one olefin polymer.

The multilayer polymer structures according to the invention comprise a layer (B) containing from 100% to 10% by weight of at least one grafted olefin polymer and from 0 to 90% by weight of at least one halohydrocarbon polymer, the grafted olefin polymer being obtained by grafting a polymerizable monomer, a functional oligomer or a functional telomer onto a preactivated olefin polymer.

The expression "preactivated olefin polymer" is intended to denote that the olefin polymer is modified before the polymerizable monomer, the functional oligomer or the functional telomer is grafted so as to result in the formation of a grafted olefin polymer.

The expression "grafted olefin polymer" is intended to denote an olefin polymer whose polymer trunk is grafted with a polymeric graft, either laterally or at the end of the chain.

The degree of grafting of the grafted olefin polymers according to the invention, measured using a Fourier transform infrared spectrometer, is usually greater than or equal to 0.5% by mass. The degree of grafting of the grafted olefin polymers according to the invention is usually less than or equal to 50, preferably less than or equal to 35 and in a particularly preferred manner less than or equal to 20% by mass.

In the multilayer polymer structures according to the invention, the layer (B) contains at least 10%, preferably at least 15% and in a particularly preferred manner at least 20% by weight of at least one grafted olefin polymer.

In the multilayer polymer structures according to the invention, the layer (B) contains not more than 100%, preferably not more than 97% and in a particularly preferred manner not more 95% by weight of at least one grafted olefin polymer.

In the multilayer polymer structures according to the invention, the layer (B) may contain no halohydrocarbon polymer. The layer (B) preferably contains at least 3% and in a particularly preferred manner at least 5% by weight of at least one halohydrocarbon polymer.

In the multilayer polymer structures according to the invention, the layer (B) contains not more than 90%, preferably not more than 85% and in a particularly preferred manner not more than 80% by weight of at least one halohydrocarbon polymer.

According to a first variant of the multilayer polymer structures according to the invention, the grafted olefin polymer of the layer (B) is obtained by grafting a polymerizable monomer onto an olefin polymer that has been preactivated by ozonization.

For the purposes of the present invention, the term "polymerizable monomer" is intended to denote a monomer whose polymerization may be initiated in the presence of the preactivated olefin polymer.

Preferably, the polymerizable monomer is chosen from alkyl acrylates, alkyl methacrylates, acrylamide, methacrylamide and fluorovinyl monomers.

In a particularly preferred manner, the polymerizable monomer is chosen from alkyl acrylates whose alkyl radicals are linear or branched, optionally substituted with a hydroxyl or ether function, and which contain from 1 to 10 carbon atoms, alkyl methacrylates whose alkyl radicals are linear or branched, optionally substituted with a hydroxyl or ether function, and which contain from 1 to 10 carbon atoms, acrylamide, methacrylamide and fluorovinyl monomers.

As examples of alkyl acrylates whose alkyl radicals are linear or branched, optionally substituted with a hydroxyl or ether function, and which contain from 1 to 10 carbon atoms, mention may be made of methyl acrylate, ethyl acrylate, isopropyl acrylate, n-butyl acrylate, isobutyl acrylate, t-butyl acrylate, hexyl acrylate, ethylhexyl acrylate and glycidyl acrylate.

As examples of alkyl methacrylates whose alkyl radicals are linear or branched, optionally substituted with a hydroxyl or ether function, and which contain from 1 to 10 carbon atoms, mention may be made of methyl methacrylate, ethyl methacrylate, isopropyl methacrylate, n-butyl methacrylate, isobutyl methacrylate, t-butyl methacrylate, hexyl methacrylate, ethylhexyl methacrylate and glycidyl methacrylate.

Examples of fluorovinyl monomers that may be mentioned include fluoroalkyl acrylates and methacrylates such as trifluoroethyl, trifluoropropyl, pentafluoropropyl and hexafluoroisopropyl acrylates and methacrylates and fluoroolefins such as tetrafluoroethylene, trifluoroethylene, vinylidene fluoride, vinyl fluoride, monochlorotrifluoroethylene and hexafluoropropylene In a most particularly preferred manner, the polymerizable monomer is chosen from methyl methacrylate, ethyl acrylate, n-butyl acrylate and vinylidene fluoride.

Good results have been obtained with methyl methacrylate.

The olefin polymer before activation by ozonization is preferably chosen from homopolymers of olefins such as ethylene, propylene, 1-butene, 4-methyl-1-pentene, 1-hexene and 1-octene, copolymers of these various olefins with each other, the copolymers of these olefins with at least one other monomer such as diolefins and unsaturated carboxylic acid esters, and blends of these various polymers.

Olefin polymers that are particularly preferred are ethylene homopolymers, propylene homopolymers, copolymers of ethylene with at least one other olefin chosen from propylene, 1-butene, 4-methyl-1-pentene, 1-hexene and octene, copolymers of propylene with at least one other olefin chosen from ethylene, 1-butene, 4-methyl-1-pentene, 1-hexene and 1-octene, 1-butene homopolymers, copolymers of ethylene or of propylene with minor amounts of diolefins or of unsaturated carboxylic acid esters, for instance ethylene/butadiene copolymers, propylene/butadiene copolymers, ethylene/vinyl acetate copolymers and ethylene/ethyl acrylate copolymers, and also from blends of these various olefin polymers.

Ethylene homopolymers; propylene homopolymers, copolymers of ethylene with at least one other olefin chosen from propylene, 1-butene, 4-methyl-1-pentene, 1-hexene and octene, copolymers of propylene with at least one other olefin chosen from ethylene, 1-butene, 4-methyl-1-pentene, 1-hexene and 1-octene, and also blends of these various olefin polymers, are most particularly preferred.

The term "ozonization" is intended to denote the reaction of the olefin polymer melt with ozone, optionally mixed with air.

The reaction of the olefin polymer with ozone may be performed in any apparatus usable for this purpose. Mention may be made, for example, of a fluidized-bed jacketed reactor.

The ozonization time is usually from about 40 to 100 minutes. The ozone concentration is usually from about 0.003 to 0.008 g/l. The ozonization reaction is preferably performed with mechanical stirring and at room temperature.

The grafting of the polymerizable monomer onto the olefin polymer that has been preactivated by ozonization is usually performed while the olefin polymer preactivated by ozonization is in melt form.

The grafting of the polymerizable monomer onto the olefin polymer melt preactivated by ozonization may be performed in any apparatus usable for this purpose. Thus, the process may be performed, without discrimination, using blenders of external-or internal type. Blenders of internal type are the most suitable, and among these, the Brabender® batch blenders and continuous blenders, such as screw extruders, for example co-rotating twin-screw extruders.

The grafting time is usually from about 1 to 60 minutes depending on the type of blender.

Preferably, the grafting of the polymerizable monomer onto the olefin polymer preactivated by ozonization is performed in a continuous blender. The grafting time is then in a particularly preferred manner from about 1 to 5 minutes.

The temperature at which the grafting takes place is usually between 100 and 200° C.

According to a second variant of the multilayer polymer structures according to the invention, the grafted olefin polymer of the layer (B) is obtained by grafting a polymerizable monomer onto an olefin polymer that has been preactivated by reaction with a free-radical initiator.

The polymerizable monomer is as defined above in the first variant of the multilayer polymer structures according to the invention.

The olefin polymer before activation by reaction with a free-radical initiator is as defined above in the first variant of the multilayer polymer structures according to the invention.

The term "free-radical initiator" is intended to denote any molecule that can by thermal decomposition generate radicals capable of generating macroinitiators by abstraction of hydrogen atoms from the chains of the olefin polymer. Examples that may be mentioned include organic peroxides, for instance dicumyl peroxide and di-t-butyl peroxide.

The reaction of the olefin polymer with the free-radical initiator usually takes place while the olefin polymer is in melt form.

The reaction of the olefin polymer melt with the free-radical initiator may be performed in any apparatus usable for this purpose. Thus, the process may be performed, without discrimination, with blenders of external or internal type. Blenders of internal type are the most suitable, and among these the Brabender® batch blenders and continuous blenders, such as screw extruders, for example co-rotating twin-screw extruders.

The reaction time is usually from about 1 to 60 minutes depending on the type of blender.

Preferably, the reaction of the olefin polymer melt with the free-radical initiator is performed in a continuous blender. The reaction time is then in a particularly preferred manner from about 1 to 5 minutes.

The grafting of the polymerizable monomer onto the olefin polymer that has been preactivated by reaction with a free-radical initiator is preferably performed by introducing the polymerizable monomer at the same time as the olefin polymer and the free-radical initiator into the continuous blender.

The grafting of the polymerizable monomer onto the olefin polymer that has been preactivated by reaction with a free-radical initiator is thus preferably performed while the olefin polymer preactivated by reaction with a free-radical initiator is in melt form.

The grafting time is in a particularly preferred manner from about 1 to 5 minutes.

The free-radical initiator concentration is usually from about 0.01% to 10% by weight relative to the amount of polymerizable monomer and the temperature at which the grafting takes place is usually between 100 and 200° C.

According to a third variant of the multilayer polymer structures according to the invention, the grafted olefin polymer of the layer (B) is obtained by grafting a functional oligomer or a functional telomer onto an olefin polymer that has been preactivated by functionalization.

According to a first embodiment, the grafted olefin polymer is obtained by grafting a functional oligomer onto an olefin polymer that has been preactivated by functionalization.

The term "functional oligomer" is intended to denote a polymer of low molecular mass (with a degree of polymerization of between 5 and 1 000) obtained by controlled free-radical polymerization (also known as living free-radical polymerization).

The term "controlled free-radical polymerization" (also known as living free-radical polymerization) is intended to denote any free-radical polymerization which, via very good control of the propagation, termination and transfer steps, makes it possible to control the average molecular mass, the molecular mass distribution width, the structure and the functionality of the oligomer chains obtained. Among these polymerizations, mention may be made of the free-radical polymerizations known as "Reversible Addition Fragmentation Transfer" (RAFT), "Atom Transfer Radical Polymerization" (ATRP), "Initiator Transfer Terminator" (INIFERTER), "Macromolecular Design through Interchange of Xanthates" (MADIX) and "Stable Free Radical Polymerization" (SFRP).

Preferably, the functional oligomer is chosen from alkyl acrylate functional oligomers, alkyl methacrylate functional oligomers, acrylamide functional oligomers, methacrylamide functional oligomers and fluorovinyl monomer functional oligomers.

In a particularly preferred manner, the functional oligomer is chosen from alkyl acrylate functional oligomers whose alkyl radicals are linear or branched, optionally substituted with a hydroxyl or ether function, and which contain from 1 to 10 carbon atoms, alkyl methacrylate functional oligomers whose alkyl radicals are linear or branched, optionally substituted with a hydroxyl or ether function, and which contain from 1 to 10 carbon atoms, acrylamide functional oligomers, methacrylamide functional oligomers and fluorovinyl monomer functional oligomers.

As examples of alkyl acrylates whose alkyl radicals are linear or branched, optionally substituted with a hydroxyl or ether function, and which contain from 1 to 10 carbon atoms, mention may be made of methyl acrylate, ethyl acrylate, isopropyl acrylate, n-butyl acrylate, isobutyl acrylate, t-butyl acrylate, hexyl acrylate, ethylhexyl acrylate and glycidyl acrylate.

As examples of alkyl methacrylates whose alkyl radicals are linear or branched, optionally substituted with a hydroxyl or ether function, and which contain from 1 to 10 carbon atoms, mention may be made of methyl methacrylate, ethyl methacrylate, isopropyl methacrylate, n-butyl methacrylate, isobutyl methacrylate, t-butyl methacrylate, hexyl methacrylate, ethylhexyl methacrylate and glycidyl methacrylate.

Examples of fluorovinyl monomers that may be mentioned include fluoroalkyl acrylates and methacrylates such as trifluoroethyl, trifluoropropyl, pentafluoropropyl and hexafluoroisopropyl acrylates and methacrylates, and fluoroolefins such as tetrafluoroethylene, trifluoroethylene, vinylidene fluoride, vinyl fluoride, monochlorotrifluoroethylene and hexafluoropropylene.

In a most particularly preferred manner, the functional oligomer is chosen from methyl methacrylate, ethyl acrylate, n-butyl acrylate and vinylidene fluoride functional oligomers.

Good results have been obtained with methyl methacrylate functional oligomers.

According to a second embodiment, the grafted olefin polymer is obtained by grafting a functional telomer onto an olefin polymer that has been preactivated by functionalization.

The term "functional telomer" is intended to denote a polymer of low molecular mass (with a degree of polymerization of between 5 and 200) obtained by free-radical telomerization.

The term "free-radical telomerization" is intended to denote any free-radical polymerization in the presence of a transfer agent known as a telogenic agent.

Preferably, the functional telomer is chosen from alkyl acrylate functional telomers, alkyl methacrylate functional telomers, acrylamide functional telomers, methacrylamide functional telomers and fluorovinyl monomer functional telomers.

In a particularly preferred manner, the functional telomer is chosen from alkyl acrylate functional telomers whose alkyl radicals are linear or branched, optionally substituted with a hydroxyl or ether function, and which contain from 1 to 10 carbon atoms, alkyl methacrylate functional telomers whose alkyl radicals are linear or branched, optionally substituted with a hydroxyl or ether function, and which contain from 1 to 10 carbon atoms, acrylamide functional telomers, methacrylamide functional telomers and fluorovinyl monomer functional telomers.

As examples of alkyl acrylates whose alkyl radicals are linear or branched, optionally substituted with a hydroxyl or ether function, and which contain from 1 to 10 carbon atoms, mention may be made of methyl acrylate, ethyl acrylate, isopropyl acrylate, n-butyl acrylate, isobutyl acrylate, t-butyl acrylate, hexyl acrylate, ethylhexyl acrylate and glycidyl acrylate.

As examples of alkyl methacrylates whose alkyl radicals are linear or branched, optionally substituted with a hydroxyl or ether function, and which contain from 1 to 10 carbon atoms, mention may be made of methyl methacrylate, ethyl methacrylate, isopropyl methacrylate, n-butyl methacrylate, isobutyl methacrylate, t-butyl methacrylate, hexyl methacrylate, ethylhexyl methacrylate and glycidyl methacrylate.

Examples of fluorovinyl monomers that may be mentioned include fluoroalkyl acrylates and methacrylates such as trifluoroethyl, trifluoropropyl, pentafluoropropyl and hexafluoroisopropyl acrylates and methacrylates, and fluoroolefins such as tetrafluoroethylene, trifluoroethylene, vinylidene fluoride, vinyl fluoride, monochlorotrifluoroethylene and hexafluoropropylene.

In a most particularly preferred manner, the functional telomer is chosen from methyl methacrylate, ethyl acrylate, n-butyl acrylate and vinylidene fluoride functional telomers.

Good results have been obtained with methyl methacrylate functional telomers.

The olefin polymers that have been preactivated by functionalization, onto which may be grafted the functional telomers or the functional oligomers, are preferably olefin polymers functionalized with epoxide, maleic anhydride, carboxylic, hydroxyl, amine, oxazoline, azlactone or isocyanate functions.

Among the olefin polymers functionalized with epoxide functions, mention may be made of ethylene/glycidyl methacrylate, ethylene/methyl acrylate/glycidyl methacrylate, ethylene/ethyl acrylate/glycidyl methacrylate, ethylene/butyl acrylate/glycidyl methacrylate, ethylene/glycidyl acrylate, ethylene/methyl acrylate/glycidyl acrylate, ethylene/ethyl acrylate/glycidyl acrylate and ethylene/butyl acrylate/glycidyl acrylate random copolymers, and grafted copolymers in which the reactive function, in this case glycidyl methacrylate or glycidyl acrylate, is grafted onto olefin polymers.

Among the olefin polymers functionalized with maleic anhydride functions, mention may be made of random copolymers of ethylene/methyl acrylate/maleic anhydride type or of ethylene/ethyl acrylate/maleic anhydride type and grafted copolymers in which the reactive function, in this case maleic anhydride, is grafted onto olefin polymers.

Among the olefin polymers that have been functionalized with other reactive functions of carboxylic, hydroxyl, amine, oxazoline, azlactone and isocyanate type, mention may be made of the grafted copolymers obtained by the free-radical grafting of monomers bearing the reactive functions mentioned onto olefin polymers.

The grafting of the functional oligomer or of the functional telomer onto the olefin polymer that has been preactivated by functionalization is usually performed while the olefin polymer that has been preactivated by functionalization is in melt form.

The grafting of the functional oligomer or of the functional telomer onto the olefin polymer melt that has been preactivated by functionalization may be performed in any apparatus usable for this purpose. Thus, the process may be performed, without discrimination, with blenders of external or internal type. Blenders of internal type are the most suitable, and among these the Brabender® batch blenders and continuous blenders, such as screw extruders, for example co-rotating twin-screw extruders.

The grafting time is usually from about 1 to 60 minutes depending on the type of blender.

Preferably, the grafting of the functional oligomer or of the functional telomer onto the olefin polymer that has been preactivated by functionalization is performed in a continuous blender. The grafting time is then in a particularly preferred manner from about 1 to 5 minutes.

The temperature at which the grafting takes place is usually between 100 and 200° C.

A catalyst may be added to accelerate the grafting reaction, for instance N,N-dimethyllaurylamine, in amounts of about from 0.1 to 1% by weight.

The multilayer polymer structures according to the invention comprise a layer (C) based on at least one olefin polymer.

The term "olefin polymers" for the layer (C) is intended to denote homopolymers of olefins such as ethylene, propylene, 1-butene, 4-methyl-1-pentene, 1-hexene and 1-octene, copolymers of these various olefins with each other, copolymers of these olefins with at least one other monomer such as diolefins and unsaturated carboxylic acid esters, and blends of these various polymers.

Olefin polymers that are particularly preferred are ethylene homopolymers, propylene homopolymers, copolymers of ethylene with at least one other olefin chosen from propylene, 1-butene, 4-methyl-1-pentene, 1-hexene and octene, copolymers of propylene with at least one other olefin chosen from ethylene, 1-butene, 4-methyl-1-pentene, 1-hexene and 1-octene, 1-butene homopolymers, copolymers of ethylene or of propylene with minor amounts of diolefins or of unsaturated carboxylic acid esters, for instance ethylene/butadiene copolymers, propylene/butadiene copolymers, ethylene/vinyl acetate copolymers and ethylene/ethyl acrylate copolymers, and also from blends of these various olefin polymers.

Ethylene homopolymers, propylene homopolymers, copolymers of ethylene with at least one other olefin chosen from propylene, 1-butene, 4-methyl-1-pentene, 1-hexene and octene, copolymers of propylene with at least one other olefin chosen from ethylene, 1-butene, 4-methyl-1-pentene, 1-hexene and 1-octene, and also blends of these various olefin polymers, are most particularly preferred.

Other polymers that are compatible with the olefin polymer constituting the layer (C) may also be blended therewith.

The olefin polymer constituting the layer (C) may be identical to or different from the olefin polymer used to prepare the grafted olefin polymer of the layer (B). Advantageously, an olefin polymer of the same nature as the olefin polymer used to prepare the grafted olefin polymer of the layer (B) is used as constituent of the layer (C).

Thus, according to a first variant, the olefin polymer used to prepare the grafted olefin polymer of the layer (B) and the olefin polymer of the layer (C) are chosen in a particularly preferred manner from ethylene homopolymers, copolymers of ethylene with at least one other olefin chosen from propylene, 1-butene, 4-methyl-1-pentene, 1-hexene and octene, and blends of these various ethylene polymers.

According to a second variant, the olefin polymer used to prepare the grafted olefin polymer of the layer (B) and the olefin polymer of the layer (C) are chosen in a particularly preferred manner from propylene homopolymers, copolymers of propylene with at least one other olefin chosen from ethylene, 1-butene, 4-methyl-1-pentene, 1-hexene and 1-octene, and blends of these various propylene polymers.

The multilayer polymer structures according to the invention also comprise a layer (A) based on at least one halohydrocarbon polymer.

The term "halohydrocarbon polymer" is intended to denote the homopolymers and copolymers obtained from monoethylenic monomers containing at least 2 carbon atoms and at least one halogen atom chosen from fluorine and chlorine. It is also intended to denote blends of homopolymers and copolymers. As examples of halohydrocarbon polymers that may be used in the present invention, mention may be made especially of vinylidene fluoride, vinyl fluoride, trifluoroethylene, chlorotrifluoroethylene, tetrafluoroethylene, hexafluoropropylene, vinyl chloride and vinylidene chloride homopolymers and copolymers, and also copolymers of one of these monomers with another non-halogenated monoethylenic monomer such as ethylene, vinyl acetate and acrylic or methacrylic monomers.

The halohydrocarbon polymer of the layer (A) is preferably a fluorohydrocarbon polymer.

The term "fluorohydrocarbon polymer" is intended to denote the homopolymers and copolymers obtained from monoethylenic monomers containing at least 2 carbon atoms and at least one fluorine atom. The monoethylenic monomers may also contain one or more chlorine atoms in addition to the fluorine atoms. It is also intended to denote blends of homopolymers and copolymers. As examples of fluorohydrocarbon polymers that may be used in the present invention, mention may be made especially of vinylidene fluoride, vinyl fluoride, trifluoroethylene, chlorotrifluoroethylene, tetrafluoroethylene and hexafluoropropylene homopolymers and copolymers, and also copolymers of one of these monomers with another non-halogenated monoethylenic monomer such as ethylene, vinyl acetate and acrylic or methacrylic monomers.

In a most preferred manner, the halohydrocarbon polymer of the layer (A) is a vinylidene fluoride polymer.

For the purposes of the present invention, the term "vinylidene fluoride polymer" is intended to denote any polymers containing at least about 50% by weight of monomer units derived from vinylidene fluoride. The vinylidene fluoride polymers that may be suitable for preparing the multilayer polymer structures according to the invention thus comprise either vinylidene fluoride homopolymers or vinylidene fluoride copolymers containing monomer units derived from one or more ethylenically unsaturated, advantageously fluorinated comonomers, and also blends of these polymers. As examples of fluorinated comonomers that may be used, mention may be made of vinyl fluoride, trifluoroethylene, chlorotrifluoroethylene, tetrafluoroethylene and hexafluoropropylene.

The halohydrocarbon polymer constituting the layer (A) may be identical or different in nature to the halohydrocarbon polymer that may be one of the constituents of the layer (B). Advantageously, a halohydrocarbon polymer of the same nature as the halohydrocarbon polymer that is one of the constituents of the layer (B) is used as constituent of the layer (A).

Preferably, the halohydrocarbon polymer of the layer (A) and the halohydrocarbon polymer of the layer (B) are a vinylidene fluoride polymer.

Other polymers that are compatible with the halohydrocarbon polymer constituting the layer (A) may also be blended therewith. An example of such a blend is a composition of vinylidene fluoride polymer and of polymethyl methacrylate.

It is understood that each of the polymers constituting the multilayer polymer structures according to the invention may contain the usual additives used during the manufacture or implementation of this polymer, for instance lubricants, plasticizers, heat stabilizers, light stabilizers, particulate or fibrous fillers, pigments, flame retardants, etc., provided that these additives do not perturb the objects of the present invention.

The multilayer polymer structures according to the invention have the great advantage of involving only one adhesive, which can bind satisfactorily to a layer of halohydrocarbon polymer on one side and to a layer of olefin polymer on the other side, and which is furthermore characterized by a well-controlled structure and architecture. These structures also have the advantage of combining good adhesion with good barrier properties and with a cost that is not too high, and of being easily coextruded industrially.

The invention also relates to a process for preparing the multilayer polymer structures according to the invention.

Use may be made of any usual techniques for assembling polymer layers to prepare the multilayer polymer structures according to the invention. An example of such techniques that may be mentioned includes thermal bonding involving a solution of the layer (B) based on a polymer adhesive in a solvent or a mixture of solvents. Other common and suitable techniques for assembling polymer layers to prepare the multilayer polymer structures according to the invention include those in which the constituent polymers are used at a temperature at least equal to their softening point. Preferably, the preparation of the multilayer polymer structures according to the invention is performed by colaminating, coextrusion, for example coextrusion-laminating, coextrusion-blow moulding and coextrusion-moulding, extrusion-coating, coating, overinjection-moulding or coinjection-moulding.

The process for preparing the multilayer polymer structures according to the invention is performed in a particularly preferred manner by colaminating, coextrusion or overinjection-moulding.

The choice of one or other of these assembly techniques is made on the basis of the use for which the multilayer polymer structures are intended. For example, pipes, tubes, films, sheets and plaques are preferably assembled by coextrusion.

Thus, the process for preparing multilayer polymer structures is preferably performed by coextrusion of a layer (A) based on at least one halohydrocarbon polymer and of a layer (C) based on at least one olefin polymer, with which is coextruded as an intermediate serving as binder a layer (B) containing from 100% to 10% by weight of at least one grafted olefin polymer and from 0 to 90% by weight of at least one halohydrocarbon polymer, the grafted olefin polymer being obtained by grafting a polymerizable monomer, a functional oligomer or a functional telomer onto a preactivated olefin polymer.

The thickness of the polymer layers constituting the multilayer polymer structures according to the invention and the total thickness of the said structures are not critical and obviously depend on the use for which they are intended.

The thickness of the layer (A) may be between 50 $\mu$m and 600 $\mu$m. The thickness of the layer (B) may be between 30 $\mu$m and 400 $\mu$m.

The invention also relates to the use of the multilayer polymer structures according to the invention for the manufacture of tubes, pipes, cladding, films, sheets, profiles, plaques and hollow bodies.

The multilayer polymer structures according to the invention may be used advantageously in fields of application that require good impermeability to liquids and gases, combined with high chemical inertness. As non-limiting practical examples of uses of multilayer polymer structures according to the invention, mention may be made of pipes for conveying fuel, corrosive products or ultrapure waters; tubes for conveying gases; films for protecting against the corrosion of motor vehicle bodywork parts; composite plaques, sheets and films for uses in the construction and agricultural industries; packaging bottles; liquid storage tanks and fuel tanks.

The multilayer polymer structures of the present invention have a good peel force and combine the advantages of a halohydrocarbon polymer with the properties inherent to the olefin polymer to which it is bonded.

The examples that follow are intended to illustrate the present invention without, however, limiting its scope.

EXAMPLES 1 TO 3

Materials Used

The polyethylene used to synthesize the grafted polyethylene according to Examples 1 and 2 is a high-density polyethylene characterized by:
- number-average and weight-average molecular masses, measured by steric exclusion chromatography in trichlorobenzene (solution concentration: 0.5 g/l) at 135° C., of 16 000 g/mol and 160 000 g/mol, respectively,
- a density of 0.938 g/cm$^2$ (measured according to ASTM standard D 1505),
- an MFI (melt flow index measured according to ASTM standard D 1238, at 190° C. under a 5 kg load) of 2.3 g/10 min, and
- a melting point of 127° C.

The polymerizable monomer used is 97% pure methyl methacrylate sold by Aldrich.

The initiator used is 98% pure dicumyl peroxide sold by Aldrich.

The polyvinylidene fluoride used to prepare the multilayer polymer structures according Example 3 (layer (A)) is a vinylidene fluoride homopolymer Solef® 1008 sold by Solvay.

The polyvinylidene fluoride used to prepare the intermediate layer (layer (B)) of the multilayer polymer structures according to Example 3 is a vinylidene fluoride homopolymer Solef® 1010 sold by Solvay.

The polyethylene used to prepare the multilayer polymer structure according to Example 3 (layer (C)) is the high-density polyethylene Eltex® Tub 121 sold by Solvay.

Determination of the Degree of Grafting Using a Fourier Transform Infrared Spectrometer This method is based on the establishment of a calibration curve using mechanical blends of polyethylene/polymethyl methacrylate of known proportions. Thin films were prepared by pressing each of these blends at 190° C. for 1 minute at 150 bar. The films obtained were then analysed using a Nicolet 510 P FT-IR Fourier transform spectrometer. From the spectra obtained, the ratio $I_{1732}/I_{1368}$ was calculated ($I_{1732}$ being the intensity corresponding to the carbonyl group of the polymethyl methacrylate and $I_{1368}$ being the intensity corresponding to the symmetrical bending of the methyl groups in the polyethylene), which was plotted on a graph, thus obtaining an $I_{1732}/I_{1368}$ calibration curve as a function of the weight percentage of polymethyl methacrylate.

The degree of grafting of the methyl methacrylate in the grafted polyethylene was obtained by determining the $I_{1732}/I_{1368}$ intensity ratio from the infrared spectrum of the grafted polyethylene and by plotting this value on the calibration curve.

Determination of the Peel Force

The peel force was measured on an Instron Corporation machine after leaving the pressed structures at rest for 7 days, by the following method: the level of adhesion between the polyvinylidene fluoride layer and the high-density polyethylene layer was measured by performing a peel test on 10 mm by 200 mm strips obtained from a 120/240 pressed plaque and partially delaminated, each outer layer being attached to the jaws of the machine, and the jaws being pulled apart at a constant speed of 50 mm/min. The result was expressed in N/cm.

Example 1

Synthesis of Polyethylene Grafted with Methyl Methacrylate Using Polyethylene Activated by Ozonization The ozonization of the high-density polyethylene was performed in a jacketed reactor with a bed fluidized with an air/ozone mixture. The ozone generator was a laboratory ozonizer manufactured by Trailigaz under the reference "Minibloc 76". The ozone concentration produced was equal to 0.0083 g/l. After an ozonization time of 45 minutes at an air/ozone flow rate of 1 500 l.h$^{-1}$, an ozone generator power of 240 w.h$^{-1}$, at room temperature, the reaction medium was placed under a stream of air to remove the residual ozone.

The ozonized polyethylene and the methyl methacrylate (10% by mass) were mixed together and were then placed in an oven at 55° C. for 5 hours. The bulk grafting was then performed in a Clextral BC21 interpenetrating co-rotating twin-screw extruder. The extrusion was performed at 150° C. The mean residence time in the extruder was about 100–150 seconds.

The grafted polyethylene obtained was finally purified by dissolution in refluxing xylene for one hour and precipitation from acetone at room temperature. After drying, the degree of grafting measured using the Fourier transform spectrometer was 1.40% by mass.

Example 2

Synthesis of a Polyethylene Grafted with Methyl Methacrylate Using Polyethylene Activated by Reaction with a Free-Radical Initiator The high-density polyethylene, the methyl methacrylate (18% by mass) and the dicumyl peroxide (0.6% by mass) were mixed together and then left for 30 minutes at room temperature. Bulk grafting was then performed in a Clextral BC21 interpenetrating co-rotating twin-screw extruder. The extrusion was performed at 150° C. The mean residence time in the extruder was about 100–150 seconds.

The grafted polyethylene obtained was finally purified by dissolution in refluxing xylene for one hour and precipitation from acetone at room temperature. After drying, the degree of grafting measured using the Fourier transform spectrometer was 4% by mass.

Example 3

Adhesion Tests

A three-layer structure was obtained by hot-pressing, at 190° C. for 5 minutes at 100 bar, an Eltex® TUB 121 high-density polyethylene (hdPE) film 1 mm thick (layer (C)), a Solef® 1008 polyvinylidene fluoride (PVDF) film 100 μm thick (layer (A)) and, as intermediate layer (layer (B)), 5 g of a blend in powder form of a grafted polyethylene and of polyvinylidene fluoride Solef® 1010 in a 1/3 grafted polyethylene/2/3 polyvinylidene fluoride Solef® 1010 ratio. The grafted polyethylenes tested were the grafted copolymer obtained in Example 1 and the grafted copolymer obtained in Example 2. A two-layer structure (without the intermediate layer (B)) was prepared as a comparative example.

The table below collates the values of the maximum peel force measured for the various structures.

| Systems studied | Maximum peel force (N/cm) |
| --- | --- |
| hdPE-PVDF | 0 |
| hdPE-grafted copolymer of Example 1-PVDF | 17.9 |
| hdPE-grafted copolymer of Example 2-PVDF | 18.6 |

EXAMPLES 4 TO 8

Example 4

Synthesis of a Methyl Methacrylate Functional Telomer 5 g of methyl methacrylate, 0.041 g of azobisisobutyronitrile, 0.325 g of mercaptoethanol and 3.369 g of acetonitrile were introduced into a two-necked round-bottomed flask equipped with a condenser connected to a nitrogen inlet, and with a magnetic stirrer. After sparging the reaction mixture with nitrogen, the flask was immersed in an oil bath thermostatically maintained at 70° C. for a period of 8 hours. At the end of the reaction, the acetonitrile was removed from the reaction medium using a rotary evaporator (pressure= 160 mmHg, temperature=50° C.); the telomer thus obtained was dissolved in 10 ml of tetrahydrofuran and finally precipitated from 400 ml of water. The telomer was recovered by filtration through a No. 4 sinter funnel and then oven-dried at 50° C. for 24 hours.

The methyl methacrylate telomer obtained was characterized by a number-average molecular mass and a polydispersity index, measured by steric exclusion chromatography in tetrahydrofuran thermostatically maintained at 30° C., after calibrating the apparatus using samples of isomolecular polymethyl methacrylate standards, of 1 500 g/mol and 2, respectively.

Example 5

Synthesis of Polypropylene Grafted with Methyl Methacrylate by Grafting a Methyl Methacrylate Functional Telomer onto a Propylene Polymer Preactivated by Functionalization 32 g of maleic anhydride-grafted polypropylene sold under the brand name Admer® QF500E and 8 g of the methyl methacrylate functional telomer synthesized in Example 4 were introduced into a Brabender® internal blender. The mixture was blended at 180° C. for 10 minutes at a spin speed of 32 rpm. The blend obtained was then used to prepare a film as described in Example 6.

Example 6

Preparation of Films

Films 100 μm thick were prepared by pressing 2 g of material for 2 minutes at 200° C. under a pressure of 100 bar, after preheating for 2 minutes at 200° C. for the following materials:

polypropylene sold under the brand name Isplen® PP-070;

maleic anhydride-grafted polypropylene sold under the brand name Admer® QF500E;

polypropylene grafted with methyl methacrylate, synthesized in Example 5, and the polyvinylidene fluoride homopolymer Solef® 1010/0001 sold by Solvay.

Example 7

Adhesion Test on a Three-Layer Structure

A three-layer structure was prepared using the films prepared in Example 6.

This three-layer structure was obtained by hot-pressing, at 200° C. for 2 minutes under a pressure of 100 bar, after preheating at 200° C. for 2 minutes, the film of polypropylene Isplen® PP-070 (layer (C)), the film of polyvinylidene fluoride homopolymer Solef® 1010/0001 (layer (A)) and, as intermediate layer (layer (B)), the film of methyl methacrylate-grafted polypropylene synthesized in Example 5.

The three-layer structure obtained was subjected to the adhesion test by manual stripping, which consists in manually pulling on the two films of the outer layers (A and C) and observing whether these two films adhere to each other.

Application of the adhesion test by manual stripping to the three-layer structure described above made it possible to observe that there was good adhesion between the film constituting the layer (A) and that constituting the layer (C)

Example 8 (Comparative)

Adhesion Tests on Two-Layer Structures

Two-layer structures (without the intermediate layer (B)) were prepared as comparative examples, using films prepared in Example 6. These two-layer structures were obtained by hot-pressing, at 200° C. for 2 minutes under a pressure of 100 bar, after preheating at 200° C. for 2 minutes, the film of polyvinylidene fluoride homopolymer Solef® 1010/0001 as layer (A), and, as layer (C), either the film of polypropylene Isplen® PP-070 or the film of maleic anhydride-grafted polypropylene Admer® QF500E.

The two two-layer structures obtained were subjected to the adhesion test by manual stripping. In both cases, it was found that there was no adhesion between the film constituting the layer (A) and the film constituting the layer (C), since the films were detached from each other very readily.

What is claimed is:

1. A multilayer polymer structure comprising a layer (A) comprising at least one fluorohydrocarbon polymer linked to a layer (C) comprising at least one olefin polymer via a layer (B) comprising from 97% to 10% by weight of at least one grafted olefin polymer and from 3 to 90% by weight of at least one fluorohydrocarbon polymer, wherein the grafted olefin polymer comprises units of at least one of a polymerizable monomer grafted onto a preactivated olefin polymer, wherein the polymerizable monomer is at least one selected from the group consisting of alkyl acrylates, alkyl methacrylates, acrylamide, methacrylamide and fluorovinyl monomers.

2. The multilayer polymer structure according to claim 1, wherein the grafted olefin polymer is obtained by grafting a polymerizable monomer onto an olefin polymer that has been preactivated by ozonization.

3. The multilayer polymer structure according to claim 1, wherein the grafted olefin polymer is obtained by grafting a polymerizable monomer onto an olefin polymer that has been preactivated by reaction with a free-radical initiator.

4. The multilayer polymer structure according to claim 1, wherein the olefin polymer used to prepare the grafted olefin polymer of the layer (B) and the olefin polymer of the layer (C) are at least one selected from the group consisting of ethylene homopolymers, copolymers of ethylene with propylene, copolymers of ethylene with 1-butene, copolymers of ethylene with 4-methyl-1-pentene, copolymers of ethylene with 1-hexene, copolymers of ethylene with 1-octene, and blends thereof.

5. The multilayer polymer structure according to claim 1, wherein the olefin polymer used to prepare the grafted olefin polymer of the layer (B) and the olefin polymer of the layer (C) are at least one selected from the group consisting of propylene homopolymers, copolymers of propylene with ethylene, copolymers of propylene with 1-butene, copolymers of propylene with 4-methyl-1-pentene, copolymers of propylene with 1-hexene, copolymers of propylene with 1-octene, and blends thereof.

6. The multilayer polymer structure according to claim 1, wherein the fluorohydrocarbon polymer of the layer (A) and the fluorohydrocarbon polymer of the layer (B) are a vinylidene fluoride polymer.

7. A process for preparing the multilayer polymer structure according to claim 1, comprising at least one of colaminating, coextrusion, extrusion-laminating, coating, overinjection-moulding or coinjection-molding at least one of the layers (A), (B) or (C).

8. A molded article comprising the multilayer polymer structure according to claim 1.

9. The molded article of claim 8 selected from the group consisting of a tube, pipe, cladding, film, sheet, profile, plaque and hollow body.

10. A multilayer polymer structure comprising a layer (A) comprising at least one fluorohydrocarbon polymer linked to a layer (C) comprising at least one olefin polymer via a layer (B) comprising from 100% to 10% by weight of at least one grafted olefin polymer and from 0 to 90% by weight of at least one halohydrocarbon polymer, wherein the grafted olefin polymer comprises units of at least one of a functional oligomer or a functional telomer grafted onto a preactivated olefin polymer.

11. The multilayer polymer structure according to claim 10, wherein the grafted olefin polymer comprises units of at least one functional oligomer selected from the group consisting of alkyl acrylate functional oligomers, alkyl methacrylate-functional oligomers, acrylamide functional oligomers, methacrylamide functional oligomers and fluorovinyl monomer functional oligomers.

12. The multilayer polymer structure according to claim 11, wherein the functional oligomer is at least one selected from the group consisting of alkyl acrylate functional oligomers whose alkyl radicals are linear or branched, optionally substituted with a hydroxyl or ether function, and which contain from 1 to 10 carbon atoms, alkyl methacrylate functional oligomers whose alkyl radicals are linear or branched, optionally substituted with a hydroxyl or ether function, and which contain from 1 to 10 carbon atoms, acrylamide functional oligomers, methacrylamide functional oligomers and fluorovinyl monomer functional oligomers.

13. The multilayer polymer structure according to claim 12, wherein the functional oligomer is at least one selected from the group consisting of methyl methacrylate, ethyl acrylate, n-butyl acrylate and vinylidene fluoride functional oligomers.

14. The multilayer polymer structure according to claim 10, wherein the grafted olefin polymer comprises units of at least one functional telomer selected from the group consisting of alkyl acrylate functional telomers, alkyl methacrylate functional telomers, acrylamide functional telomers, methacrylamide functional telomers and fluorovinyl monomer functional telomers.

15. The multilayer polymer structure according to claim 14, wherein the functional telomer is at least one selected from the group consisting of alkyl acrylate functional telomers whose alkyl radicals are linear or branched, optionally substituted with a hydroxyl or ether function, and which contain from 1 to 10 carbon atoms, alkyl methacrylate functional telomers whose alkyl radicals are linear or branched, optionally substituted with a hydroxyl or ether function, and which contain from 1 to 10 carbon atoms, acrylamide functional telomers, methacrylamide functional telomers and fluorovinyl monomer functional telomers.

16. The multilayer polymer structure according to claim 15, wherein the functional telomer is at least one selected from the group consisting of methyl methacrylate, ethyl acrylate, n-butyl acrylate and vinylidene fluoride functional telomers.

17. The multilayer polymer structures according to claim 10, wherein the grafted olefin polymer is obtained by grafting a functional oligomer or a functional telomer onto an olefin polymer that has been preactivated by functionalization.

18. The multilayer polymer structure according to claim 10, wherein the olefin polymer used to prepare the grafted olefin polymer of the layer (B) and the olefin polymer of the layer (C) are at least one selected from the group consisting of ethylene homopolymers, copolymers of ethylene with at least one other olefin chosen from propylene, 1-butene, 4-methyl-1-pentene, 1-hexene and octene, and blends of these ethylene polymers.

19. The multilayer polymer structure according to claim 10, wherein the olefin polymer used to prepare the grafted olefin polymer of the layer (B) and the olefin polymer of the layer (C) are at least one selected from the group consisting of propylene homopolymers, copolymers of propylene with at least one other olefin chosen from ethylene, 1-butene, 4-methyl-1-pentene, 1-hexene and 1-octene, and blends of these propylene polymers.

20. The multilayer polymer structure according to claim 10, wherein the fluorohydrocarbon polymer of the layer (A) and the halohydrocarbon polymer of the layer (B) are a vinylidene fluoride polymer.

21. A process for preparing a multilayer polymer structure according to claim 10, comprising at least one of colaminating, coextrusion, extrusion-laminating, coating, overinjection-moulding or coinjection-moulding at least one of the layers (A), (B), or (C).

22. A molded article comprising the multilayer polymer structure according to claim 10.

23. The molded article according to claim 22 selected from the group consisting of a tube, pipe, cladding, film, sheet, profile, plaque and hollow body.

* * * * *